May 29, 1951     E. E. HARRIS     2,555,033

SPECIAL PACKAGE FOR FROZEN UNCOOKED PIE CRUSTS

Filed May 6, 1949

INVENTOR.
Eula E. Harris
BY
Mason, Fenwick & Lawrence
Attorneys

Patented May 29, 1951

2,555,033

UNITED STATES PATENT OFFICE 2,555,033

SPECIAL PACKAGE FOR FROZEN UNCOOKED PIE CRUSTS

Eula Edmonds Harris, Greenwich, Conn.

Application May 6, 1949, Serial No. 91,816

2 Claims. (Cl. 99—172)

This invention relates to special packages and it has for its general object a packaged uncooked dough pie crust adapted to be kept frozen until desired for use.

A more specific object of the invention is to provide a packaged disk of uncooked pie crust dough enclosed in a flexible moistureproof wrapping, the same being embraced between stiff supporting members, one of said members having a hole which exposes the pie crust in its flexible wrapping, so that after it has been out of the refrigerator or deep freeze it can be tested to ascertain if it has been thawed out, by pressing it with the finger through said hole. This avoids the need for the expedient of trying to bend the package near the corner to test the flexibility of the disk of dough, resulting in the disk snapping in two and becoming worthless, in the event that it has not been thawed.

Another object of the invention is the provision of a package that will keep the fragile frozen disk of pie crust dough from becoming bent or broken, and protecting it from the dehumidifying effects incident to its having been stored in a freezing chamber.

Other objects of the invention will appear as the following description of a preferred and practical embodiment thereof proceeds.

In the drawing which accompanies the following specification and throughout the figures of which the same reference characters have been used to denote identical parts:

Figure 2:
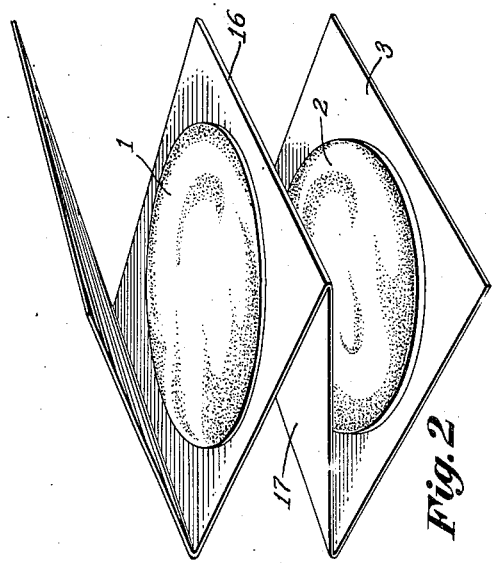
Figure 2 is a perspective view of the flexible paper band, between which the pie crust disks are interleaved.

Referring now in detail to the several figures, the numerals 1 and 2 represent flat frozen disks of uncooked moist pie crust dough ready to be thawed, put into the pie pan and baked. Two is the minimum number of disks packaged, one being for the upper crust. In the case of an open faced pie, the package contains the crust for two pies.

Since these disks of pie crust dough are designed to be stored frozen, they must be so packaged as to protect them from dehumidification in the freezing chamber. The package must be of such nature as to keep them from contamination by other flavors in the deep freeze or refrigerator. Since, when frozen, the disks of pie crust dough being thin are quite fragile, the package must be such as to protect them from the hazards of transportation as well as storage.

The package in its preferred form comprises the following correlated elements. The flexible folded moistureproof sheet 3, which is folded accordion fashion and between the folds of which the disks of dough are interleaved. The stiff folder 4, having the hole 5 in the center of one side, embraces the sheet 3 when the latter is in its completely folded substantially flat condition, with its contiguous folds heat sealed about the pie crust disks, as shown at 6 in Figure 1.

The folder 4, with its contents, goes into the flexible envelope 7, preferably in reverse direction so that the closed end 8 of the folder is at the open end 9 of the envelope 7, thus sealing the open edges of the folder. The envelope 7 is then slipped into the wrapper 10, which may be of fairly stiff paper as it is designed to carry the printed dress of the package. It has a central hole 11, which registers with the hole 5 in the stiff folder and this hole is duplicated on both sides so that the wrapper may be used indiscriminately with either side up, that is, next to the perforated side of the folder.

Figure 6:
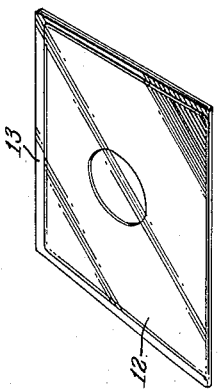
Figure 6 is a perspective view of the assembled package.
Figures 3, 5:
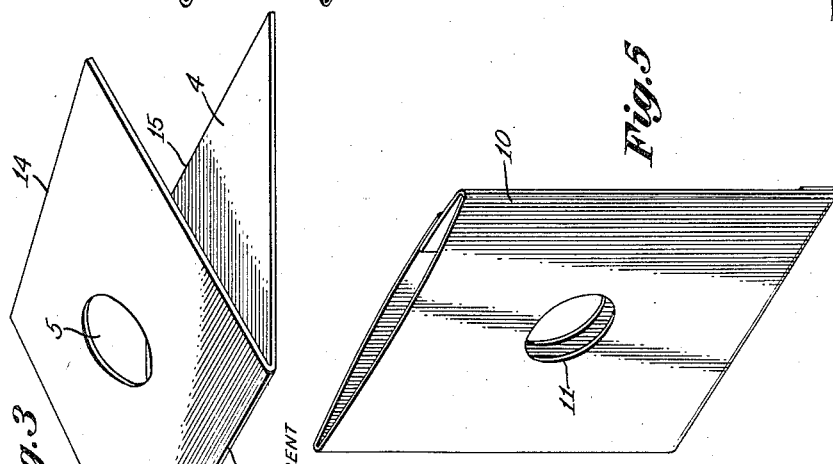
Figure 3 is a perspective view of the stiff folder which embraces the folded paper band.
Figure 5 is a perspective view of the wrapper which contains the envelope shown in Figure 4, and its contents.
Figure 4:
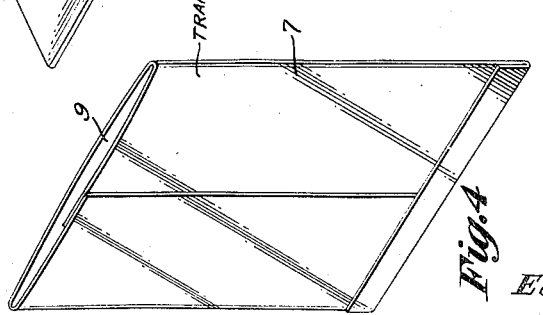
Figure 4 is a perspective view of the outer flexible envelope that encloses the folder.
Figure 1:
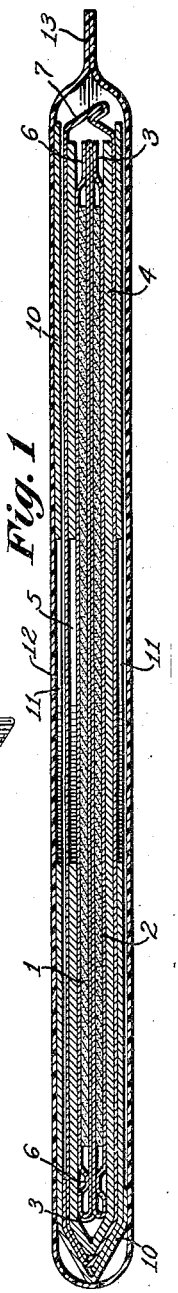
Figure 1 is a cross-section from top to bottom through a special package embodying the principles of the invention.

Finally, the wrapper with its contents is slipped into the transparent bag 12, Figures 1 and 6, the open end 13 of which is sealed flat and forms a hand hold so that the package can be carried vertically suspended.

The pie crust disks 1 and 2 adhere slightly to the surfaces of the paper sheet 3, which they contact, but are not tacky and come off clean when lifted. Additionally to their inherent slight adhesiveness they are kept in position by the heat sealed seam 6 that surrounds them. Furthermore, when the folder 4 is inserted reversely in the envelope 9, the free edges 14 and 15 of the folder are pinched together in the bottom of the envelope and thus made to exert slight pressure upon the pie crust disks, preventing the latter from shifting in the package, regardless of the position in which it is carried or stored.

The pie crust disks are intended to be hard frozen and remain in this state until they reach the consumer. A few minutes before the pie is to be made, the package must be taken from the refrigerator or deep freeze and exposed to room temperature for a few minutes until thawed out. Frozen prepared uncooked pie crusts have been known, packaged in conventional manner, but there was no satisfactory way in which to ascertain when they were thawed out, so that consumers frequently adopted the expedient of bending the corner of the package to tell by its flexibility that the pie crusts had thawed. If they were still frozen, they would snap in two and be ruined. In the subject invention the presence of the central hole in the stiff folder, or the presence of registering holes in the wrapper 10 and folder 4 provides an area in which the pie crust dough disks are exposed through only flexible sheets so that they can be tested by pressing with the finger upon the disks in the region of the hole, the yielding of the disks under pressure indicating that they are thawed.

In Figure 2, the two pie crust disks 1 and 2 are interleaved between independent pairs of folds of the sheet 3. This has the advantage that the housewife may wish at the time to make a single open face pie, and by cutting the sheet 3 along the dihedral apex 16, she retains the disk 2 completely covered by two folds of the sheet 3, for future use. It is within the purview of the invention, however, to place the upper disk 1 in the opposite dihedral angle 17 where it will still be interleaved between folds of the sheet 3. By so doing, there is a saving of paper, for the uppermost fold of the sheet 3 may be omitted.

The integral folded sheet 3 may be substituted by separate sheets congruently arranged, with the pie crust dough disks interleaved between them, and the folder 4 may likewise be substituted by separate stiff cardboard sheets, one having the hole 5.

While I have in the above disclosure described what I believe to be a preferred and practical embodiment of the invention, it will be understood by those skilled in the art that the specific details of construction and arrangement of parts, as shown and described, are by way of example and not to be construed as limiting the scope of the invention.

What I claim as my invention is:
1. Special package of frozen uncooked pie crust dough comprising a unit which includes a flat disk of said dough, an inner flexible moistureproof wrapping about said disk, congruent stiff sheets between which said wrapped disk is interleaved, one of said stiff sheets having a central hole, and an outer flexible envelope containing said stiff sheets with said enclosed flexibly wrapped disk, closely fitting the same, said hole providing an area of said unit in which said wrapped disk is exposed to finger pressure transmitted through said wrapping and envelope, whereby the thawed condition of said disk is indicated by its yielding to said pressure.

2. Special package of frozen uncooked pie crust dough comprising a unit which includes a plurality of flat disks of said dough, a flexible moistureproof folded sheet between folds of which said disks are interleaved, congruent stiff sheets between which said folded sheet and its contents are interleaved, one of said stiff sheets having a central hole, a flexible envelope closed at one end receiving said congruent stiff sheets and their contents, said envelope having a central hole registering with the hole in one of said stiff sheets, said envelope providing a surface for printed matter, and a transparent envelope closed at one end receiving said first mentioned envelope and its contents, fitting thereover reversely whereby the closed end of said transparent envelope seals the open end of said first mentioned envelope, said registering central holes providing an area of said unit in which said wrapped disks are exposed to finger pressure whereby the thawed condition of said disks is indicated by their yielding to said pressure.

EULA EDMONDS HARRIS.

REFERENCES CITED

The following references are of record in the file of this patent:

UNITED STATES PATENTS

| Number | Name | Date |
|---|---|---|
| 900,714 | Eberhart | Oct. 13, 1908 |
| 1,642,804 | Byrnes | Sept. 20, 1927 |
| 2,099,257 | Bergstein | Nov. 16, 1937 |
| 2,248,289 | Thal | July 8, 1941 |
| 2,305,712 | Kaefer | Dec. 22, 1942 |